No. 677,691. Patented July 2, 1901.
G. W. PACKER.
APPARATUS FOR HANDLING, CLEANING, AND DISTRIBUTING CASTINGS.
(Application filed Aug. 15, 1900.)
(No Model.) 5 Sheets—Sheet 1.
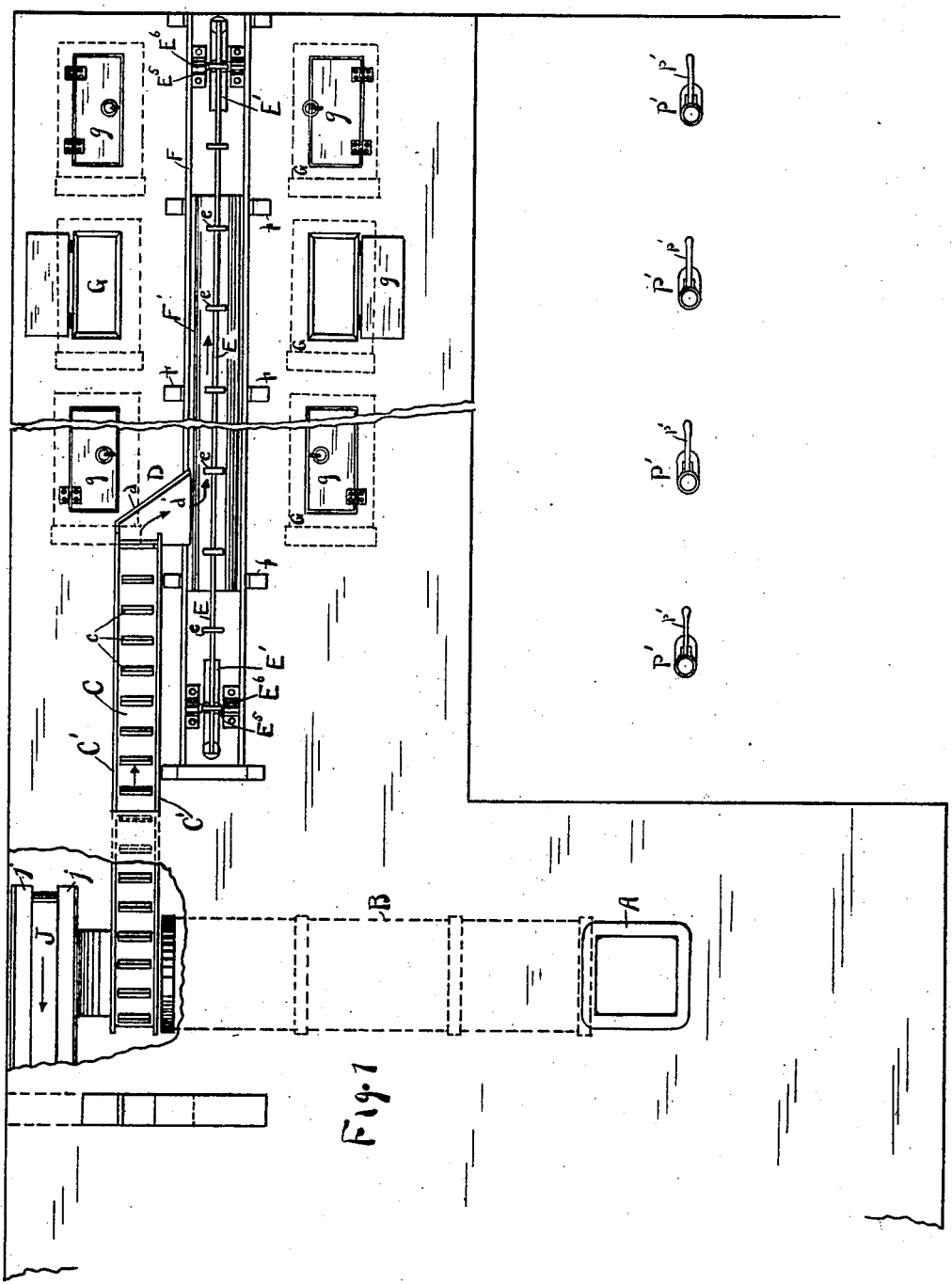
Witnesses
Oscar W Bond
Thomas B. McGregor
Inventor
George W. Packer,
By Banning & Banning
Attys.

No. 677,691. Patented July 2, 1901.
G. W. PACKER.
APPARATUS FOR HANDLING, CLEANING, AND DISTRIBUTING CASTINGS.
(Application filed Aug. 15, 1900.)
(No Model.) 5 Sheets—Sheet 2.
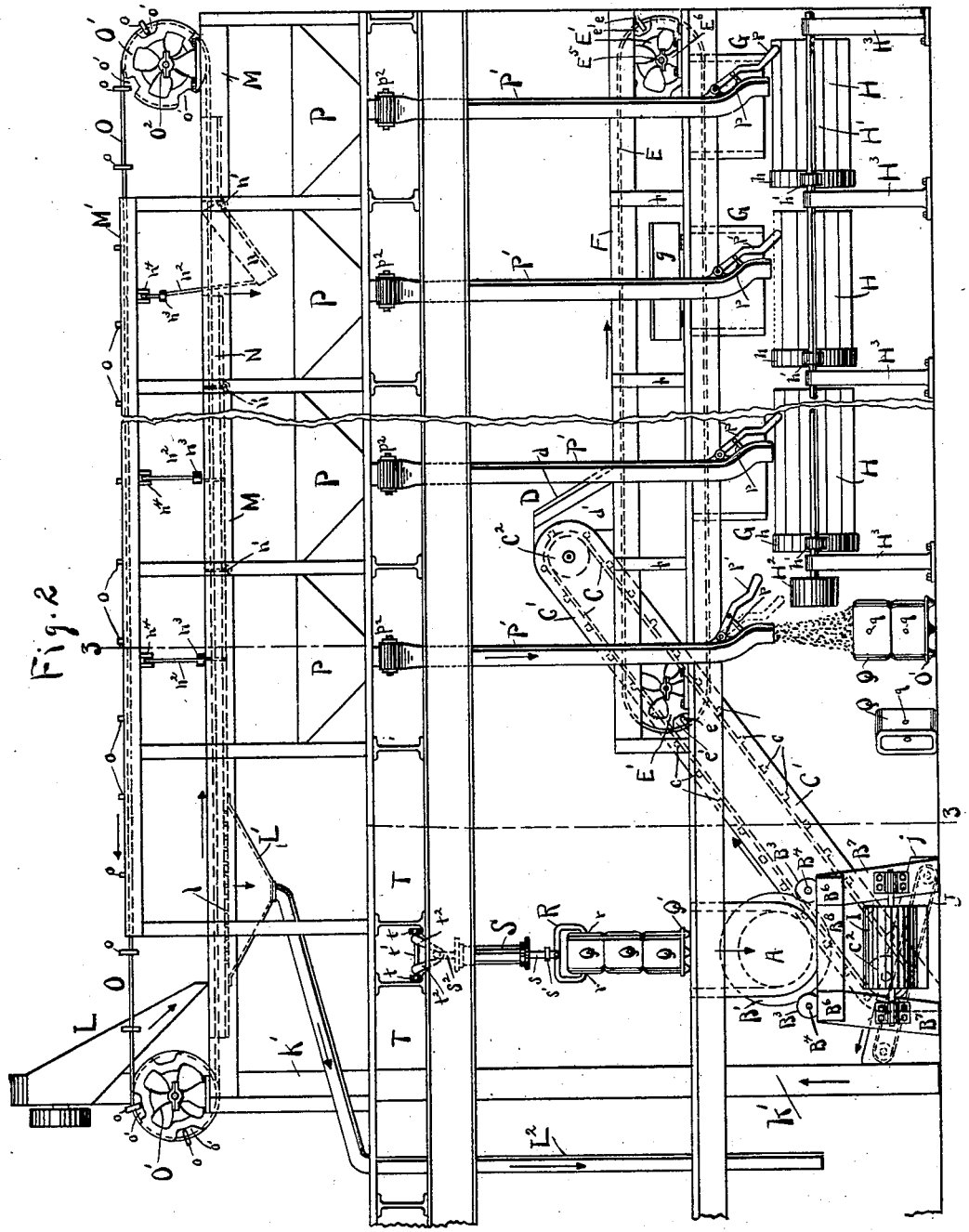
Witnesses
Oscar W. Bond.
Thomas B. McGregor
Inventor
George W Packer,
By Banning & Banning
Attys.

No. 677,691. Patented July 2, 1901.
G. W. PACKER.
APPARATUS FOR HANDLING, CLEANING, AND DISTRIBUTING CASTINGS.
(Application filed Aug. 15, 1900.)
(No Model.) 5 Sheets—Sheet 3.
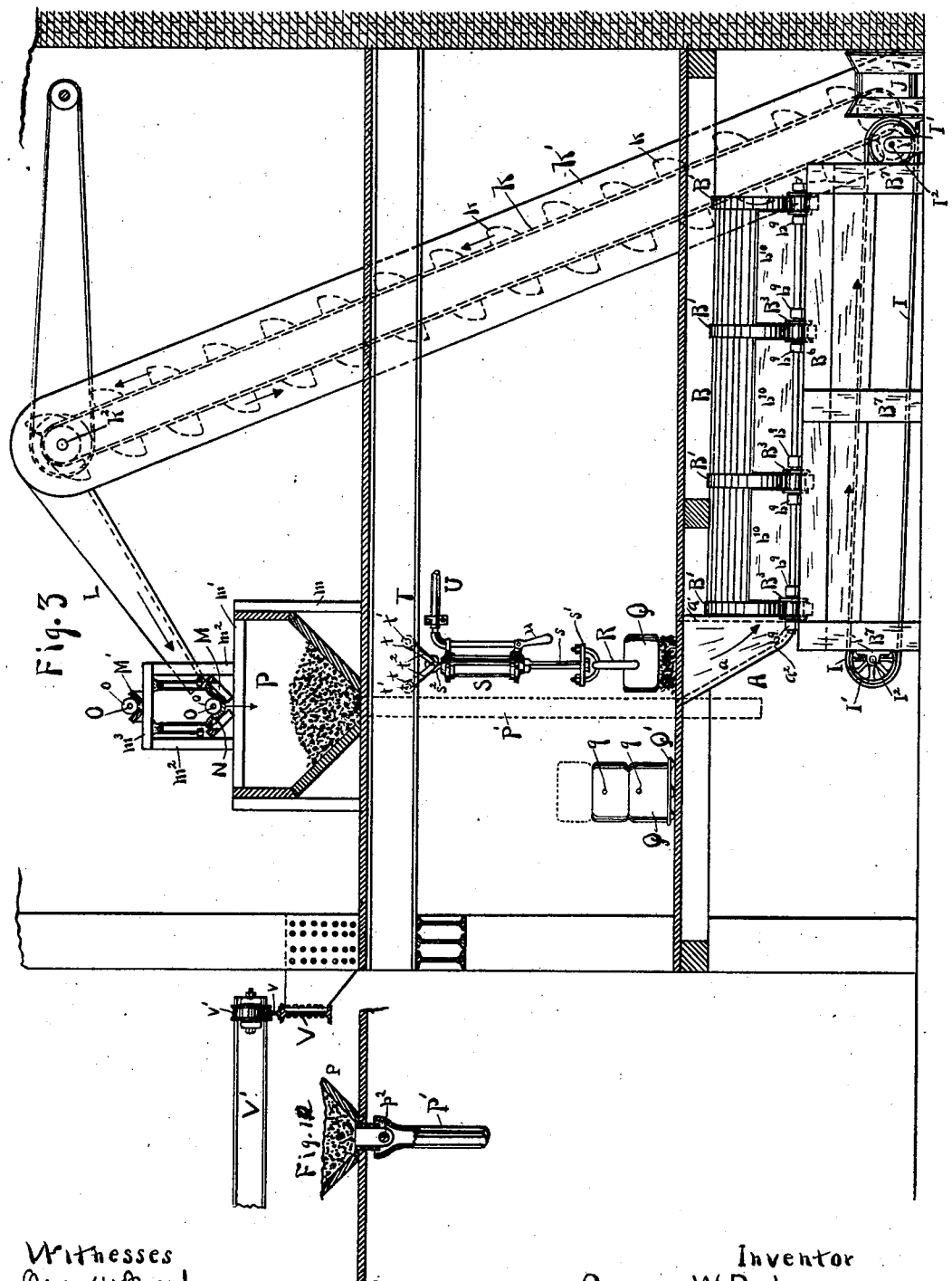
Witnesses
Oscar W. Bond,
Thomas B. McGregor
Inventor
George W. Packer,
By Banning & Banning,
Attys.

No. 677,691. Patented July 2, 1901.
G. W. PACKER.
APPARATUS FOR HANDLING, CLEANING, AND DISTRIBUTING CASTINGS.
(Application filed Aug. 15, 1900.)
(No Model.) 5 Sheets—Sheet 4.
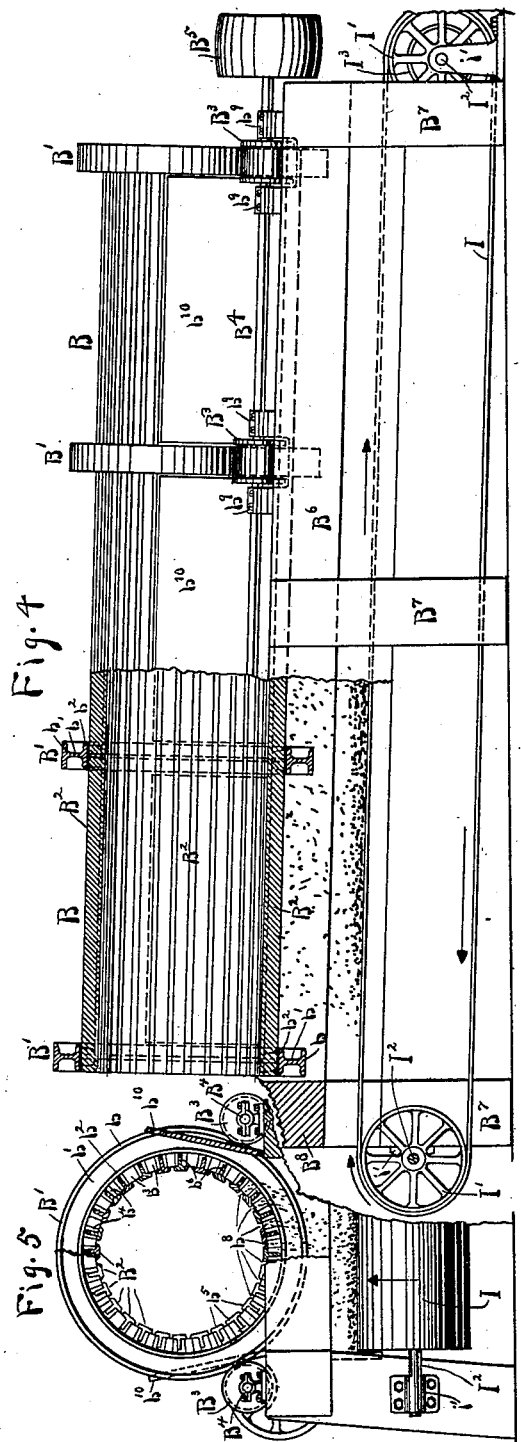
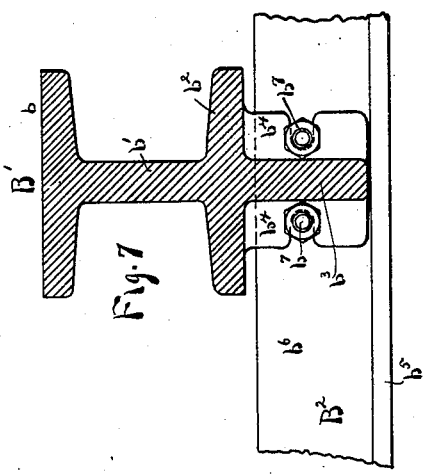
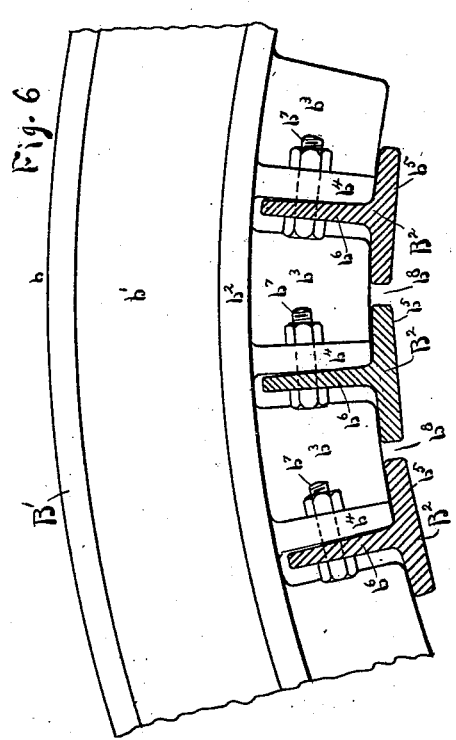
Witnesses
Inventor
George W. Packer,
By Banning & Banning,
Attys.

No. 677,691. Patented July 2, 1901.
G. W. PACKER.
APPARATUS FOR HANDLING, CLEANING, AND DISTRIBUTING CASTINGS.
(Application filed Aug. 15, 1900.)
(No Model.) 5 Sheets—Sheet 5.
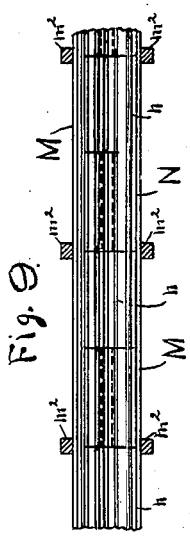
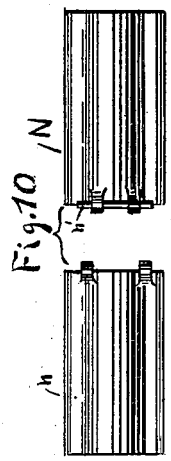
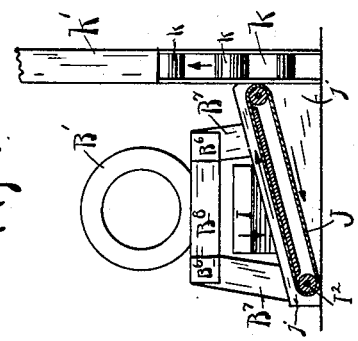
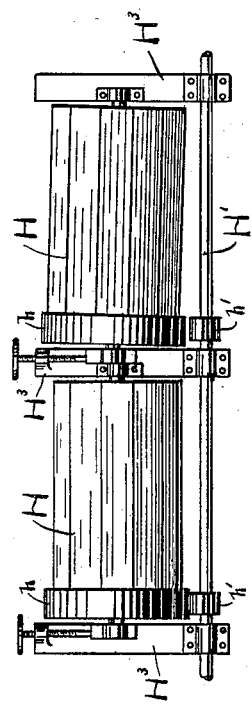
Witnesses
Oscar W. Bond
Thomas McGregor
Inventor
George W. Packer.
By Banning & Banning,
Attys.

UNITED STATES PATENT OFFICE.

GEORGE W. PACKER, OF CHICAGO, ILLINOIS, ASSIGNOR TO THE DEERING HARVESTER COMPANY, OF SAME PLACE.

APPARATUS FOR HANDLING, CLEANING, AND DISTRIBUTING CASTINGS.

SPECIFICATION forming part of Letters Patent No. 677,691, dated July 2, 1901.

Application filed August 15, 1900. Serial No. 26,907. (No model.)

*To all whom it may concern:*

Be it known that I, GEORGE W. PACKER, a citizen of the United States, residing at Chicago, in the county of Cook and State of Illinois, have invented certain new and useful Improvements in Apparatus for Handling, Cleaning, and Distributing Castings, of which the following is a specification.

It is exceedingly difficult in large foundries to take care of the light castings without the expenditure of considerable time and labor under the present practice of handling small and light castings. This is especially true in foundries making castings which require annealing—that is, where the castings are placed in pots with a suitable packing and then annealed in an oven, requiring after the annealing has been finished the separating of the castings from the packing. The present invention is primarily designed for use in connection with annealed castings, but can be used with ordinary castings for handling, cleaning, and distributing.

The invention consists in the features of construction and the combination of parts hereinafter described and claimed.

In the drawings the apparatus is illustrated for use in connection with annealed castings.

Figure 1 is a top or plan view showing in dotted lines the main tumbler or separating-cylinder and showing the elevator for the castings and the endless carrier for removing the castings as deposited from the elevator, and showing also the chutes or dropping-spouts for depositing the castings in the final tumblers or tumbling-barrels, the figure being shown broken in two. Fig. 2 is a side elevation showing the floors of a building with the main tumbler or separating-cylinder, the packing-conveyer apron or belt, and the final tumblers or tumbling-barrels on one floor, the elevator from the main tumbler or separating-cylinder to the conveyer on the second floor for handling the castings, the elevator for the packing from the lower floor to the upper floor, with the conveyer for the packing on the upper floor, and showing also the hoppers and spouts for the fine particles and dust of the packing and for the coarse packing, and the annealing-pot made up in sections, with the fluid-pressure cylinder for handling the pots, the figure being shown broken in two. Fig. 3 is a sectional elevation showing the three floors, with the main tumbler or separating-cylinder and the packing-conveyer on the first floor, the annealing-pot, the lifting-tongs or grappler, and the fluid-pressure cylinder on the second floor, with one section of the pot taken off and in position to drop the castings and the packing into the delivery hopper or spout of the main tumbler, and showing also the elevator for the separated packing, the discharge-spout therefrom, and the conveyer for the removal of the packing as it is discharged from the elevator, and showing also one end of a traveling crane and its supporting track and rail. Fig. 4 is a side elevation with one end in section of the main tumbler or separating-cylinder for first operating on the castings to loosen, remove, and discharge the packing. Fig. 5 is an end elevation of the main tumbler or separating-cylinder shown in Fig. 4, with the packing-conveyer broken off at one side. Fig. 6 is a detail showing a portion of the main tumbler or separating-cylinder and the manner of its construction. Fig. 7 is a cross-section of the parts shown in Fig. 6; Fig. 8, a cross-section of the packing-conveyer belt, showing also the lower end of the packing-elevator; Fig. 9, a detail, being a plan view of a portion of the packing-carrying trough or receiver; Fig. 10, a detail, being a bottom view showing two sections or divisions of the packing-carrying trough or receiver; Fig. 11, a plan view showing two of the tumblers or barrels and the mounting therefor; and Fig. 12, a detail, partly in section, of the connection for the packing-discharge spouts with their hoppers.

The apparatus as a whole, in the construction and arrangement shown, has the several parts which enter into the invention arranged upon three floors or supports. The lower floor or support has thereon the main tumbler or separating cylinder or barrel, into which the castings and packing when used in connection with annealed castings are delivered or deposited. The castings and packing are dumped into a delivery hopper or spout A, fixed to the second floor and having an inclined rear wall $a$, a straight front wall $a'$, with an opening therein in line with the opening of the main tumbler or separating cylinder or barrel, and a curved end or neck $a^2$ at the bottom to insure the passing of the castings and packing into the open end of the tumbler or cylinder.

The main tumbler or separating cylinder or barrel B is formed with encircling hoops or rings B' around the body, and the body is formed of a series of longitudinal bars $B^2$. The hoops or rings each have an outer rim $b$ and an inner rim $b^2$, connected by a neck $b'$, forming in effect a double-T construction. The inner rim $b^2$ has inward-projecting brackets or lugs, each having a plate or flange $b^4$ and a rib or fin $b^3$. The longitudinal bars of the body are each formed with a plate or flange $b^5$ and a central longitudinal rib $b^6$ for attachment to the plate or flange $b^4$ of the depending brackets or lugs of the hoops or rings by bolts $b^7$ or in any other suitable manner. The setting of the longitudinal bars is one which leaves a small space or opening $b^8$ the full length of the bars and longitudinally of the main tumbler or cylinder.

The encircling hoops or rings or encompassing bands B' act as wheels or carriers to mount the main tumbler or barrel as a whole, so as to be rotatable, for which purpose the outer rim of each hoop, ring, or band forms a tire to ride on flanged rollers or friction-pulleys $B^3$, mounted on a shaft $B^4$, supported in suitable journal boxes or bearings $b^9$ on the frame on which the main tumbler or cylinder is mounted. A shaft $B^4$, with its flanged rollers $B^3$, is provided on each side of the tumbler or cylinder, and one shaft is provided with a driving-pulley $B^5$, by means of which the shaft on one side can be revolved for the friction rollers or pulleys of the shaft to revolve the main tumbler or cylinder through the travel of the hoops, rings, or bands. The castings and packing deposited in the interior of the tumbler or separating-cylinder will carry the packing removed from the castings the same as in the operation of an ordinary tumbling barrel or cylinder. The packing after it is loosened and separated from the castings is free to fall through the interstices or openings $b^8$ of the main tumbler or cylinder, and in order to give the packing a descending direction and prevent any part or portion thereof from falling through the side of the openings guide-boards $b^{10}$ are provided on each side of the tumbler, as shown in Figs. 3, 4, and 5.

The main tumbler or separating-cylinder is supported on a framework having, as shown, side sills $B^6$, supported on posts $B^7$, with end sills $B^8$, and is set with a downward inclination toward its delivery end for its rotation to feed the castings to the delivery end of the tumbler or cylinder. The cleaned castings pass from the delivery end and are discharged onto an endless elevator or conveyer C, running between the side pieces or boards of a frame or trough C' and over wheels $C^2$, one at each end of the endless elevator or conveyer and its support in frame or side pieces. The endless belt of the elevator or conveyer is provided with straight cleats, buckets, or flights $c$, by which the castings are caught and carried upward to be delivered onto the second floor, for which purpose the elevator or conveyer C has an upward inclination, as shown in Figs. 1 and 2. The castings carried by the elevator or conveyer C are deposited into a delivery trough or spout D, having a downward and outwardly inclined bottom $d'$ and a side board or piece $d$, as shown in Figs. 1 and 2.

The trough or spout D delivers the castings to an endless conveyer E, for which purpose its delivery end is located above and extends over a trough frame or support F, within which or between the side pieces of which is a trough or receiver F', supported by the outer frame or side pieces, and the outer frame or side pieces are supported on uprights or standards $f$, extending up from the second floor or other support, as shown in Figs. 1 and 2. The endless conveyer E runs in the trough or receiver F' and, as shown, is in the form of a cable, rope, or round belt, having thereon disk or button flights or buckets $e$ at regular intervals apart, by means of which the castings as they are deposited in the trough or receiver F' from the delivery trough or spout are caught and carried along the trough or receiver F', so as to be removed therefrom by an operator or workman standing by the side of the trough or receiver or to be discharged therefrom, as hereinafter described.

The cable, rope, or belt of the endless conveyer E runs over pulley or carrying-wheels E' at each end of the conveyer. Each wheel E' is mounted on a shaft $E^5$, supported in suitable journal-boxes on standards or posts $E^6$. Each wheel has an outer rim connected with its center or hub by spokes or arms, and the rim is divided into sections by openings $e'$, one opening in line with each spoke, into which opening the disks or buttons $e$ enter as the wheel is rotated to drive or move the conveyer.

The castings, as before stated, can be taken from the receiver or trough by an operator or workman and when removed are thrown into a delivery chute or spout G. A number of these chutes or spouts are provided extending through and down from the second floor and each having a cover $g$, so that by raising the cover the operator or workman can successively deposit the castings in the several delivery chutes or spouts, using one chute or spout after another. The delivery chutes or spouts are each located over a tumbling barrel or cylinder H, as many tumbling barrels or cylinders being provided as there are chutes or spouts. Each tumbling barrel or cylinder has its body formed in sections, so that one section can be removed and leave a mouth or opening, which when in line with the chute or spout permits the castings to be delivered into the tumbling barrel or cylinder from the chute or spout. The several tumbling barrels or cylinders are driven from a common shaft H', having at one end a driving-pulley H² and mounted in suitable standards or uprights H³. Each tumbling barrel or cylinder at one end has a bearing ring or band $h$, which when the tumbling barrel or cylinder is in use contacts with a friction driving roller or pulley $h'$ for rotating the barrel or cylinder. Each tumbling barrel or cylinder is mounted in suitable journal boxes or bearings at each end, and the journal box or bearing for the end of each tumbling barrel or cylinder having thereon the friction driving ring or band $h$ is movable, so that it can be moved outward and disengage the friction band or rim from the friction roller or pulley and stop the revolving of the tumbling barrel or cylinder. The castings are given a final tumbling in the tumbling barrels or cylinders H to complete their cleaning, and when the cleaning is completed the castings are removed from the barrel or cylinder and can be taken away for use or otherwise.

The packing separated from the castings by the action of the main tumbler or separating-cylinder sifts through the interstices or openings $b^3$ and drops onto an endless conveyer I, the conveyer being of a width sufficient to receive the packing deposited from the tumbler or cylinder. The endless conveyer I is mounted upon cylinders or driving-rollers I' at each end thereof, and the cylinders or rollers are mounted on driving-shafts I², the shaft at one end being supported in suitable boxes $i$ and at the other end in standards or uprights $i'$ in the construction shown. The loose packing deposited on the conveyer I from the main tumbler or separating-cylinder is carried toward the delivery end of the conveyer, which, as shown, is in a lower plane than the opposite end, and from such delivery end of the conveyer the loose packing is deposited onto the upper face of an endless traveling belt or conveyer J, passing over a retaining-board $j$, a similar board being on the opposite side of the traveling belt or conveyer J. The traveling belt or conveyer J has a fast travel and has an upward inclination from its receiving end to its delivery end, as shown, which inclination by reason of the fast traveling of the belt further divides and separates the packing, and the packing is retained on the traveling belt or conveyer by the side boards or pieces $j$ from its point of reception until the delivery-point is reached.

The endless traveling belt or conveyer J delivers the loose packing at a point where it will be received by the buckets $k$ of an elevator-conveyer K, running between the side pieces of a support or frame K', by which buckets the loose packing is carried upward to the third floor, as shown in Fig. 3. The loose packing is discharged from the buckets into a delivery spout or trough L, having a downward and inward inclination, as shown in Figs. 2 and 3, with its delivery end in position to discharge the loose packing onto a perforated plate $l$, which acts as a sieve by which the fine material and dust are sifted into a hopper L' and carried by a discharge-spout L² to the point for its deposit. The sieve or perforated plate $l$ is located between the sides or walls of an outer frame or support M in the bottom of an inner trough or receiver N. The outer frame or support M carries the trough or receiver N and is supported on posts or uprights $m$ and cross-pieces $m'$, and extending up from the cross-pieces $m'$ are posts or uprights $m^2$, having cross-pieces $m^3$, which carry the side pieces of an upper frame or support M'. The trough or receiver N is made up of sections, and one section $n$ between each upright or post is hinged by a suitable pin or pivot $n'$, so as to have a free end that can drop, and connected with this free end is a cord $n^2$, running up over a pulley $n^3$ and having attached to its end a weight $n^4$, which permits the pivoted or drop section $n$ to fall down at its free end, leaving an opening in the trough or receiver and furnishing a spout for discharging the coarse packing. The spout is returned and held in normal position by the cord and weight to form a continuous receiver or trough M, except when one section $n$ is dropped, and the dropping of each section $n$ is permitted by an opening $m^4$ in the sides of the outer frame or support in line with the section.

An endless conveyer O, having thereon disk or button flights $o$ similar to the conveyer E, runs in the trough or receiver N and moves the packing delivered from the spout L in the trough or receiver N', and in such movement as the packing passes over the perforated plate or sieve $l$ the fine dust and particles will be sifted out and pass into the hopper L', and the coarse packing will be carried over the perforated plate or sieve to pass through the trough or receiver N until a dropped section $n$ of such receiver or trough is reached, when the coarse packing will be discharged at the opening formed by the dropped section. The cable, rope, or belt for the endless conveyer O runs over a pulley or wheel O' at each end. The pulleys or wheels O' have a similar construction to the pulleys or wheels E', each having openings $o'$ in its rim for the disk or button flights corresponding to the openings $e'$ of the rim of the pulleys or wheels E' and for the same purpose.

A hopper P is located beneath each drop-section $n$ of the trough or receiver N, into which hopper when a drop-section is down, as shown by the dotted lines in Fig. 2, the coarse packing will be deposited, and from the hopper the packing is discharged through a tube or pipe P', attached at its upper end to the hopper-discharge by a pin or pivot $p^2$ and having in its lower end a valve or shut-off on the end of a stem $p$, moved by a handle or lever $p'$ to open and close the valve, so that when opened the packing can be discharged into the pots, as shown, for one of the pipes P in Fig. 2.

The annealing-pots Q for the castings are made up in sections or divisions to facilitate handling, and each section has in its opposite side walls a hole or opening $q$ to receive the ends $r$ of the lifting and carrying tongs or grappler R, as shown in Fig. 2, so that by engaging the tongs or grappler with a section the section or division can be raised from the next succeeding section or division and be carried bodily over the receiving and delivering hopper or spout A for discharging its contents into the hopper or spout, as shown in Figs. 2 and 3. The sections or divisions composing the pot as a whole are mounted on a base $Q'$ in the arrangement shown, which base has openings below its top plate for the admission of a pick-up or lifter, which may be the pick-up or lifter of the arm or boom of an overhead traveling crane, (not shown and forming no part of the present invention,) by which the pot as a whole can be readily handled. The forming of the pot in sections or divisions and mounting the sections or divisions on a base facilitates the handling of the pot as a whole, as each of its sections or divisions can be separately and independently handled with great ease and rapidity.

The tongs or grappler R is connected by a hanger or cross-head $s'$ with a piston-rod $s$ of a fluid-pressure cylinder S, which cylinder is suspended by an eye or swivel $s^2$ from hangers or loops $t^2$, depending from axles $t'$, having carrying-wheels $t$ and running on a track T, which track, as shown, is formed by two I-beams beneath the floor, but may be otherwise formed. The fluid-pressure cylinder receives pressure through the pipe U from a compressed-air reservoir or other source of supply, and the pressure is controlled by a suitable valve operated by a handle or lever $u$. The admission of fluid-pressure into the cylinder below the piston raises the piston-rod and the tongs or grappler to be engaged with a section of the pot, and when engaged further application of fluid-pressure lifts the caught section or division free from the next succeeding section or division, and the section or division so lifted can be carried over the receiving hopper or spout A by the truck or carriage running on the track T, and when in position the pot section or division can be knocked or otherwise operated upon to discharge its contents.

An I-beam V, having thereon a rail $v$, and forming one side of a runway for an overhead traveling crane, is shown in Fig. 3, and an end of a main frame $V'$, having carrying-wheels $v'$, which run on the track, is also shown. These parts indicate the position and location of an overhead traveling crane for use in connection with the present invention in placing the filled pots in the annealing-oven, removing the pots from the oven when the castings are annealed, and depositing the pots on the floor or support to have the sections or divisions lifted one by one, and the contents discharged or emptied to pass into the main tumbler or separating-cylinder.

The operation is as follows: The pot of annealed castings is placed on the second floor or support in a position adjacent to the feed hopper or chute A and accessible to the traveling tongs or grappler. The first section or division of the pot is caught by the tongs or grappler, which have been raised into position for the purpose by the fluid-pressure cylinder and brought over the top of the pot. The caught section or division is raised clear of the remaining sections by operating the fluid-pressure cylinder to raise its piston-rod, and the section or division is then brought over the feed hopper or chute by traveling the truck or carriage of the fluid-pressure cylinder on its track, and the contents of the pot-section are emptied into the feed hopper or chute. The remaining sections or divisions of the pot are successively taken by the tongs or grappler and carried to the feed hopper or chute and discharged, and this operation is continued until all the pots containing the annealed castings have been emptied. The emptied sections or divisions are thrown to one side to be again filled and used. The pot is filled by placing a lower section on the stand or support, filling it with the castings, and discharging the packing thereinto from the packing-spout. The pot is built up by placing one section or division thereof on top of the other as a section or division is filled and packed, and when a pot is completely filled and packed it is to be removed and placed in the annealing-oven, as usual. The construction of the pot in sections or divisions renders the handling thereof more expeditious and easy, both in filling and emptying. The discharged castings and packing from a pot section or division pass through the feed hopper or chute and into the receiving end of the revolving tumbler or separating cylinder, and by the action of such tumbler or cylinder as the castings pass from the receiving end to the delivery end the packing will be separated from the castings and the castings will be discharged at the delivery end practically clear of the packing. The discharged castings pass onto the endless conveyer or elevator C and are discharged therefrom into the delivery tube or spout D to enter the trough or receiver $F'$ and be carried along in the trough or receiver by the endless conveyer E, having the disk or button flights thereon, for the castings as they are carried along to be caught by the operator or workman, removed by hand, and dropped into the hoppers or chutes G on one side or the other of the endless conveyer to pass into the tumbler-barrels H for the final cleaning, ready for use. The separated and loosened packing discharges through the interstices or spaces in the body of the main tumbler or separating-cylinder onto the conveyer I and is carried by such conveyer and discharged onto the endless traveling belt or conveyer J, to be discharged therefrom and taken by the pockets of the endless elevator or conveyer K, and discharged onto the spout L, to pass down the spout into the trough or receiver N, to be carried along in such receiver or trough by the action of the endless conveyer and its disk or button flights, passing over the perforated disk or sieve at the receiving end of the trough or receiver for the fine dust and particles to pass into the hopper L' and be discharged through the pipe L², while the coarse packing is carried along in the trough or receiver and discharged therefrom by dropping a movable section over a hopper P for the packing to enter the hopper and its discharge-pipe P' for use again.

It will thus be seen that the separating of the packing from the castings is automatically performed in the main tumbler or separating-cylinder and that the castings are carried through the tumbler or cylinder and discharged, while the packing is discharged through the body of the tumbler or cylinder, thus making a clean and distinct line of separation between the castings and the packing in the removal of each. The castings after the first cleaning and the removal of the packing therefrom are automatically carried to a point where they can be caught and delivered for the final act of cleaning. The packing is carried to a point where it can be deposited for use again and in the passage have the fine particles and dust removed, leaving the coarse packing in shape for use. The entire operation of separating the castings and the packing and separating the fine particles and dust from the coarse packing is thus rendered automatic from the start to the finish. The entire operation, with the exception of emptying the filled pot and removing the castings and filling the pots, is automatic throughout.

It will be understood that while the invention is described for use in connection with annealed castings it can be used and is intended to be used for cleaning other castings from molding-sand and other material, which result is accomplished by depositing the castings in the main tumbler or separating-cylinder to remove the sand and to discharge the sand and castings, as herein described, for the removal of the packing and discharge of the castings and packing.

I claim—

1. In an apparatus for handling, cleaning and distributing castings, the combination of a revoluble main tumbler or separating-cylinder adapted to receive castings thereinto at one end and deliver cleaned castings therefrom at the other end and formed of circumferential binding hoops or rings, each hoop or ring having a peripheral tread and a series of inwardly-projecting ears on its inner face, and longitudinal bars attached to the inwardly-projecting lugs or ears of the hoops or rings to leave open interstices or spaces between the bars longitudinally of the tumbler or separating-cylinder its full length for the discharge of the material removed from the castings, and means located in coöperative relation to the tumbler or cylinder on the under side for conveying away the removed material discharged through the interstices or spaces of the tumbler or separating-cylinder, substantially as described.

2. In an apparatus for handling, cleaning and distributing castings, the combination of a revoluble main tumbler or separating-cylinder adapted to receive castings thereinto at one end and deliver cleaned castings therefrom at the other end and formed of circumferential binding hoops or rings, each hoop or ring having a peripheral tread and a series of inwardly-projecting ears on its inner face, and longitudinal bars attached to the inwardly-projecting lugs or ears of the hoops or rings to leave open interstices or spaces between the bars longitudinally of the tumbler or separating-cylinder its full length for the discharge of the material removed from the castings, means located in coöperative relation to the tumbler or cylinder on the under side for conveying away the removed material discharged through the interstices or spaces of the tumbler or separating-cylinder, and means located in coöperative relation to the delivery end of the tumbler or separating-cylinder receiving and conveying away the cleaned castings discharged at the delivery end of the cylinder, substantially as described.

3. In an apparatus for handling, cleaning and distributing castings, the combination of a revoluble main tumbler or separating-cylinder adapted to receive castings thereinto at one end and deliver cleaned castings therefrom at the other end and having a body formed of circumferential binding hoops or rings, each hoop or ring having a peripheral tread and an interior rim united by a neck or web and each hoop or ring having on the interior rim a series of inwardly-projecting lugs or ears, and longitudinal bars each bar having a flange and a rim standing at right-angle relation one to the other for the attachment of the bar to the ears or lugs of the hoops or rings leaving open interstices or spaces longitudinally of the tumbler or separating-cylinder its full length for the discharge of the material removed from the castings by the revolution of the main tumbler or separating-cylinder, means located in coöperative relation to the tumbler or separating-cylinder on the under side receiving and conveying away the removed material discharged through the interstices or spaces of the tumbler or cylinder, means located in coöperative relation to the delivery end of the receiving and conveying-away means for the removed material and means located in coöperative relation to the delivery end of the tumbler or cylinder receiving and conveying away the cleaned castings discharged at the delivery end of the cylinder, substantially as described.

4. In an apparatus for handling, cleaning and distributing castings, a revoluble main tumbler or separating-cylinder receiving the castings thereinto and having a downward inclination toward its delivery end and having its body formed of bars set apart, leaving longitudinal open interstices or spaces between them the full length of the tumbler or separating-cylinder, to have the revolution of the tumbler or separating-cylinder as a whole clean the castings from adhering material by the action of the bars discharge the cleaned castings at the delivery end of the cylinder and escape the removed material through the longitudinal open interstices or spaces from the receiving to the delivery end of the tumbler or separating-cylinder, substantially as described.

5. In an apparatus for handling, cleaning and distributing castings, the combination of a revoluble main tumbler or separating-cylinder having its body formed of longitudinal bars with interstices or spaces between the bars for the discharge of the material removed from the castings, means for revolving the main tumbler or separating-cylinder, and deflecting-boards, one on each side of the cylinder, for preventing side escape of the material discharged, substantially as described.

6. In an apparatus for handling, cleaning and distributing castings, the combination of a revoluble main tumbler or separating-cylinder receiving thereinto the castings to be cleaned, an endless conveyer or elevator receiving the cleaned castings at the delivery end of the main tumbler or separating-cylinder, a receiver or trough into which the castings are delivered from the endless conveyer or elevator, and an endless conveyer operating in the receiver or trough to carry the castings away from the point of reception, substantially as described.

7. In an apparatus for handling, cleaning and distributing castings, the combination of a revoluble main tumbler or separating-cylinder receiving thereinto the castings to be cleaned, an endless conveyer or elevator receiving the cleaned castings at the delivery end of the tumbler or cylinder, a receiver or trough into which the castings are discharged from the endless conveyer or elevator, an endless conveyer operating in the receiver or trough to move the castings forward therein from the receiving-point, and a hopper or chute for the castings when removed from the receiver or trough, substantially as described.

8. In an apparatus for handling, cleaning and distributing castings, the combination of a revoluble main tumbler or separating-cylinder receiving thereinto the castings to be cleaned, an endless conveyer or elevator receiving the cleaned castings at the delivery end of the tumbler or cylinder, a receiver or trough in which the castings are discharged from the endless conveyer or elevator, an endless conveyer operating in the receiver or trough to move the castings forward therein from the receiving-point, a hopper or chute for the castings when removed from the receiver or trough, and a tumbling barrel receiving the castings from the chute or hopper for the final cleaning, substantially as described.

9. In an apparatus for handling, cleaning and distributing castings, a revoluble main tumbler or separating-cylinder receiving thereinto the castings to be cleaned, the combination of an endless conveyer or hopper receiving the cleaned castings at the delivery end of the tumbler or cylinder, a receiver or trough into which the castings are delivered from the endless conveyer or elevator, an endless conveyer operating in the receiver or trough to move the castings forward from the receiving-point, a series of hoppers or chutes adjacent to and alongside of the receiver or trough, and a series of tumbling barrels, one for each hopper or chute and into which the castings pass from the hopper or chute for the final cleaning action, substantially as described.

10. In an apparatus for handling, cleaning and distributing castings, the combination of a revoluble main tumbler or separating-cylinder receiving thereinto the castings to be cleaned and having its body formed with longitudinal interstices or spaces for the discharge of the material removed from the castings, an endless conveyer traveling beneath the tumbler or cylinder and receiving the discharged material thereinto, an endless traveling apron or belt receiving the material from the endless conveyer, an endless elevator or conveyer having pockets receiving the material from the traveling belt, a receiver or trough into which the material is discharged from the pockets of the endless elevator or conveyer, and an endless conveyer operating in the receiver or trough to move the material therein from its point of reception, substantially as described.

11. In an apparatus for handling, cleaning and distributing castings, the combination of a revoluble main tumbler or separating-cylinder receiving thereinto the castings to be cleaned and having its body provided with longitudinal interstices or spaces for the discharge of the material removed from the castings, an endless conveyer traveling beneath the tumbler or separating-cylinder and receiving the discharged material thereinto, an endless traveling apron or belt receiving the material from the endless conveyer, an endless elevator or conveyer having pockets receiving the material from the traveling apron or belt, a receiver or trough into which the material is discharged from the pockets of the endless elevator or conveyer and having throughout its length drop-sections, and an endless conveyer operating in the receiver or trough to move the material therein from its point of reception for discharge at the opening formed by a dropped section of the receiver or trough, substantially as described.

12. In an apparatus for handling, cleaning and distributing castings, the combination of a revoluble main tumbler or separating-cylinder receiving thereinto the castings to be cleaned and having its body provided with longitudinal interstices or spaces for the discharge of the material removed from the castings, an endless conveyer traveling beneath the tumbler or separating-cylinder and receiving the discharged material thereinto, an endless traveling apron or belt receiving the material from the endless conveyer, an endless elevator or conveyer having pockets receiving the material from the traveling apron or belt, a receiver or trough into which the material is discharged from the pockets of the endless elevator or conveyer and having throughout its length drop-sections, an endless conveyer operating in the receiver or trough to move the material therein from its point of reception for discharge at the opening formed by a dropped section of the receiver or trough, and a hopper for each drop-section receiving the material thereinto as discharged at the drop-section when down or open, substantially as described.

13. In an apparatus for handling, cleaning and distributing castings, the combination of a revoluble main tumbler or separating-cylinder receiving thereinto the castings to be cleaned and having its body provided with longitudinal interstices or spaces for the discharge of the material removed from the castings, an endless conveyer traveling beneath the tumbler or separating-cylinder and receiving the discharged material thereinto, an endless traveling apron or belt receiving the material from the endless conveyer, an endless elevator or conveyer having pockets receiving the material from the traveling apron or belt, a receiver or trough into which the material is discharged from the pockets of the endless elevator or conveyer and having throughout its length drop-sections, an endless conveyer operating in the receiver or trough to move the material therein from its point of reception for discharge at the opening formed by a dropped section of the receiver or trough, a hopper for each drop-section receiving the material thereinto as discharged at the drop-section when down or open, and a discharge-pipe leading from the hopper, substantially as described.

14. In an apparatus for handling, cleaning and distributing castings, the combination of a revoluble main tumbler or separating-cylinder receiving the castings thereinto and having its body provided with longitudinal interstices or spaces for the discharge of the material removed from the castings, an endless elevator or conveyer receiving the castings from the delivery end of the tumbler or cylinder, a receiver or trough into which the castings are discharged from the endless elevator or conveyer, an endless conveyer operating in the receiver or trough and moving the castings forward as discharged into the receiver or trough, an endless conveyer traveling beneath the tumbler or cylinder and receiving the discharged material thereinto, a traveling apron or belt receiving the material from the delivery end of the endless conveyer, an endless elevator or conveyer having pockets receiving the material from the traveling apron or belt, a receiver or trough into which the material is delivered from the pockets of the endless elevator or conveyer, and a conveyer in the receiver or trough moving the material therein from its point of reception, for separating the castings and the packing or other material in the tumbler or cylinders, dividing the travel of the two and delivering the two at different points, substantially as described.

GEORGE W. PACKER.

Witnesses:
ARTHUR JOHNSON,
CARL DETZER.